(No Model.)
G. W. WEBER.
DETACHABLE HANDLE FOR PAILS.
No. 550,427. Patented Nov. 26, 1895.
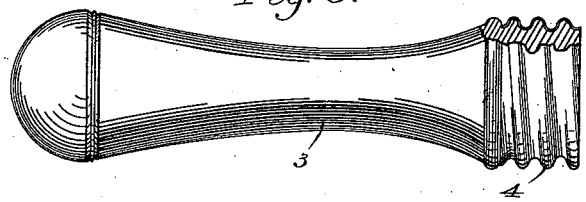
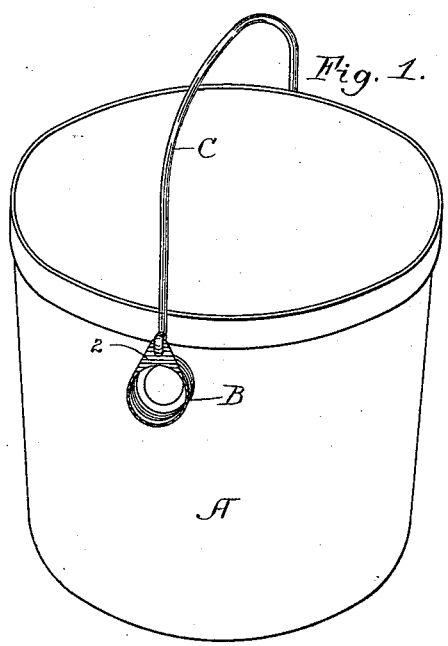
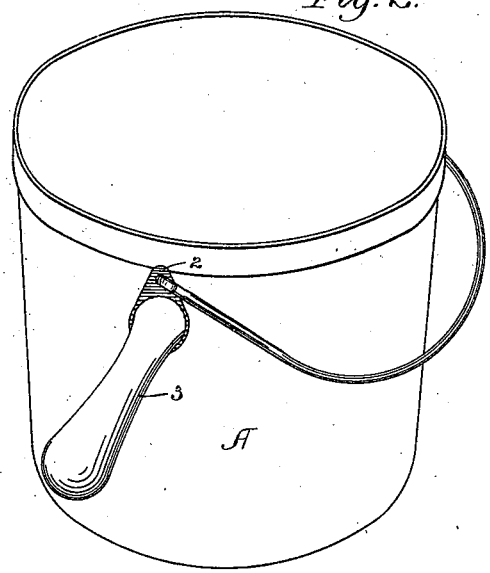
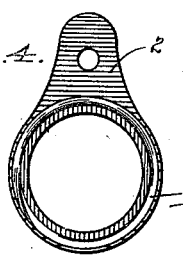
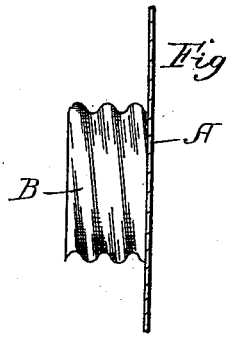
Witnesses:
F. D. Bradbury.
H. S. Johnson.
Inventor:
George W. Weber.
per: V. D. Merwin
Attorney.

UNITED STATES PATENT OFFICE.

GEORGE W. WEBER, OF ST. PAUL, MINNESOTA.

DETACHABLE HANDLE FOR PAILS.

SPECIFICATION forming part of Letters Patent No. 550,427, dated November 26, 1895.

Application filed December 31, 1894. Serial No. 533,401. (No model.)

*To all whom it may concern:*

Be it known that I, GEORGE W. WEBER, of St. Paul, Ramsey county, Minnesota, have invented certain Improvements in Detachable Handles for Pails, of which the following is a specification.

My invention relates to certain new and useful improvements in detachable handles for pails; and it consists, essentially, of a screw-threaded socket secured to the exterior of the pail, either constituting the bail-ear or independent of it, adapted to receive a supplementary detachable handle threaded to fit the socket.

My invention consists more specifically in the features of construction hereinafter described and claimed.

In the accompanying drawings, forming part of this specification, Figure 1 is a perspective view of a pail with my improved form of combination socket and bail-ear. Fig. 2 is a similar view showing the handle secured in place. Fig. 3 is a detail of the handle; and Figs. 4, 5, and 6 are details of the clip shown in Fig. 1, the form shown in Figs. 4 and 5 being provided with an ear for receiving the bail and that shown in Fig. 6 being without the ear.

In the drawings, A represents a sheet-metal pail, having secured thereto the screw-threaded socket or clip B. This clip is shown provided with an ear 2 to receive the end of the bail C. 3 is a supplementary detachable handle made, preferably, of wood and having its end 4 screw-threaded to fit into the similarly-threaded socket B.

I claim—

1. As an improved article of manufacture, a bail ear for pails having a socket to receive a supplementary detachable handle, and means for securing said handle in horizontal position therein.

2. As an improved article of manufacture, a clip or ear for pails having a hole or socket for a bail, and a socket for the detachable horizontal handle, and means for securing said detachable handle therein.

3. In combination with a pail, the screw threaded socket secured to the outside thereof, and the supplementary handle threaded to fit to said socket.

4. The combination with the pail and its bail, of the bail ear having a screw threaded socket, and the supplementary handle threaded to fit said socket.

In testimony whereof I affix my signature in presence of two witnesses.

GEO. W. WEBER.

Witnesses:
T. D. MERWIN,
H. S. JOHNSON.